US012183016B2

(12) United States Patent
Agarwala et al.

(10) Patent No.: US 12,183,016 B2
(45) Date of Patent: Dec. 31, 2024

(54) SYSTEM AND METHOD FOR TRANSPOSITION OF A DETECTED OBJECT AND ITS TRACKING TO A DIFFERENT DEVICE

(71) Applicant: CRON SYSTEMS PVT. LTD., New Delhi (IN)

(72) Inventors: Saurav Agarwala, New Delhi (IN); Tushar Chhabra, New Delhi (IN)

(73) Assignee: Mohammad Saud M Alghaith (SA)

( * ) Notice: Subject to any disclaimer, the term of this patent is extended or adjusted under 35 U.S.C. 154(b) by 94 days.

(21) Appl. No.: 17/992,508

(22) Filed: Nov. 22, 2022

(65) Prior Publication Data

US 2023/0089970 A1 Mar. 23, 2023

Related U.S. Application Data

(63) Continuation of application No. PCT/IB2021/054373, filed on May 20, 2021.

(30) Foreign Application Priority Data

May 22, 2020 (IN) .............................. 202011021514

(51) Int. Cl.
*G06T 7/292* (2017.01)
*G06F 3/01* (2006.01)
(Continued)

(52) U.S. Cl.
CPC .............. *G06T 7/292* (2017.01); *G06F 3/011* (2013.01); *G06T 19/20* (2013.01); *G06V 10/764* (2022.01);
(Continued)

(58) Field of Classification Search
CPC .... G06V 10/803; G06V 10/764; G06V 20/52; G06V 20/64; G06V 40/10; G06V 10/82;
(Continued)

(56) References Cited

U.S. PATENT DOCUMENTS

2013/0202197 A1\* 8/2013 Reeler ...................... G06T 7/20
382/154
2014/0327792 A1\* 11/2014 Mulloni ................. H04N 23/69
348/211.8
(Continued)

OTHER PUBLICATIONS

International Search Report issued for International Patent Application No. PCT/IB2021/054373 mailed on Sep. 24, 2021.

*Primary Examiner* — Phi Hoang

(57) ABSTRACT

A method is provided for transposition of a detected object and its tracking from a 3D sensor to a different system in 6 degrees of freedom. The method includes receiving sensing data from the one or more 3D sensors, generating 3D cartesian coordinates of reflections and intensities with respect to the respective 3D sensors, searching, detecting, classifying, segmenting, tracking and forecasting motion of objects in the 3D surrounding keeping the respective 3D sensor as origin, transposing the origin for the coordinates of the searched, detected, classified and tracked object in real time to one or more secondary devices, and providing the real time detection, classification and tracking of the object to a user context application with the one or more secondary devices as origin, without any delay real time covering all 6 Degrees of Freedom.

11 Claims, 4 Drawing Sheets

(51) Int. Cl.
*G06T 19/20* (2011.01)
*G06V 10/764* (2022.01)
*G06V 10/80* (2022.01)
*G06V 10/82* (2022.01)
*G06V 20/52* (2022.01)
*G06V 20/64* (2022.01)
*G06V 40/10* (2022.01)

(52) U.S. Cl.
CPC .............. *G06V 10/803* (2022.01); *G06V 10/82* (2022.01); *G06V 20/52* (2022.01); *G06V 20/64* (2022.01); *G06V 40/10* (2022.01)

(58) Field of Classification Search
CPC ........... G06T 2207/30232; G06T 19/20; G06T 7/292; G06T 2207/10028; G06T 2200/04; G06T 2207/30196; G06T 2207/30241; G06F 3/011
See application file for complete search history.

(56) References Cited

U.S. PATENT DOCUMENTS

| | | | |
|---|---|---|---|
| 2016/0239331 A1* | 8/2016 | Tamura | G06F 9/50 |
| 2016/0335130 A1* | 11/2016 | Abdallah | G06F 9/4881 |
| 2019/0147220 A1 | 5/2019 | McCormac et al. | |
| 2020/0021850 A1* | 1/2020 | Niu | H04N 19/109 |
| 2020/0074739 A1* | 3/2020 | Stauber | G06F 3/011 |
| 2022/0066456 A1* | 3/2022 | Ebrahimi Afrouzi | G06F 3/04883 |

* cited by examiner

SYSTEM AND METHOD FOR TRANSPOSITION OF A DETECTED OBJECT AND ITS TRACKING TO A DIFFERENT DEVICE

CROSS-REFERENCE TO RELATED APPLICATIONS

This application is a continuation under 35 U.S.C. § 120 of International Application PCT/IB2021/054373, filed May 20, 2021, which claims priority to Indian Application No. 202011021514, filed May 22, 2020, the contents of each of which are incorporated by reference herein.

FIELD OF THE INVENTION

Embodiments of the present invention generally relate to application of 3D sensing technologies and more particularly to a system and a method for transposition of a detected object and its tracking from a 3D sensor to a different device in 6 degrees of freedom.

BACKGROUND OF THE INVENTION

Three-dimensional (3D) sensing technology is considered as a momentous scientific breakthrough. 3D scanning enables collecting data regarding the depth, position, shape and appearance that could be either further analysed or accurate digital 3D models could be constructed.

Three-dimensional (3D) scanning may be enabled by means of technologies such as Laser Triangulation, Structured Light, Time of Flight, and the like. Devices such as Light Detection And Ranging (LIDAR), Laser Detection And Ranging (LADAR), Light-emitting diode detection and ranging (LeDDAR), Radio Detection and Ranging (RaDAR) and Depth Sensing Cameras like Microsoft Kinect or Intel RealSense scanners are commonly used for 3D scanning. LIDAR, LADAR and LEDDAR in general is used for measuring distances (ranging) by illuminating the target with laser light and measuring the reflection with a sensor. Similarly RaDAR in general is used for measuring distances (ranging) by illuminating the target with Radio Waves in C, K or mmWave Bands. Time of flight of laser/light or radio wave returns and the return wavelengths and the intensities of the returns can then be used to make digital 3-D representations of the target. LIDAR/RaDAR or Depth Measuring Cameras provide an output of 3D point clouds producing highly accurate x,y,z measurements of reflections and their intensities. 3D point clouds can be used for a number of applications, such as rendering appealing visual effect based on the physical properties of 3D structures and cleaning of raw input 3D point clouds e.g. by removing moving objects (car, bike, person). Other 3D object detection, classification and recognition industry domains include agriculture, astronomy, atmosphere, Autonomous Vehicles, Biology and conservation, Forestry, Geology and soil science, Law enforcement, Mining, Image Recognition, Surveying, robotics, intelligent vehicle systems, augmented reality, transportation maps and geological surveys where high resolution digital elevation maps help in detecting subtle topographic features. Some of the major application of 3D point cloud and sensing are to create a 3D representation of a terrain's surface, 3D imaging for healthcare, smart devices, topographic analysis and prediction of soil properties in agricultural landscapes, categorise crops based on their characteristics and find the best places to plant them, mapping the surfaces of celestial bodies, guidance system for autonomous vehicles, and the like.

However, most of the applications require 3D sensors such as a LIDARs for object detection and classification or a combination of LIDAR with a camera for object visual detection and visual tracking. Further, in such applications, the 3D sensor and the camera may not be placed at the same location in a 3D space (in majority cases). So, the cartesian coordinates (3D space) detected by the 3D sensor for a detected object will not be the same for camera because the sensor and the camera are placed at two different locations and at different roll, pitch and yaw with respect to each other. This poses a lot of obstacles in obtaining the accurate final output from the 3D sensing system with the secondary sensor as origin. Presently available solutions offer highly complex computations that become increasingly difficult to implement on both the software and the hardware and the time and processing requirements increases exponentially when the number of objects searched, detected, classified, segmented, tracked and forecasted increases. Further, a lot of resources are required for processing such complex computations especially considering the 6 Degree of freedom to be taken care of, yet the detection and tracking is not in real-time and there is always lag. So, apart from lacking in ease of implementation, present solutions are neither economical nor technologically perfect.

Hence, there exists a need for a system and a method for transposition of a detected object and its tracking from a 3D sensor to a different device in 6 degrees of freedom that does not suffer from above-mentioned deficiencies.

OBJECT OF THE INVENTION

An object of the invention is to provide a system for transposition of a detected object and its tracking from a 3D sensor to a different device in 6 degrees of freedom.

Another object of the invention is to provide a method for transposition of a detected object and its tracking from a 3D sensor to a different device in 6 degrees of freedom.

Yet another object of the invention is to utilise artificial intelligence and deep learning-based technologies for object detection, classification, tracking, and transposition.

Yet another object of the invention is to provide the cartesian coordinates of the searched detected and classified objects as per the requirement of the user context application and not with respect to the 3D sensor being placed at origin. The User Context Application may be selected from applications such as, but not limited to, security & surveillance, industrial automation, warehouse automation, airport automation, smart spaces, railways, traffic intersection automation, robotics etc.

Yet another object of the invention is to share processing resources on a configurable processing unit in case the number of objects detected and tracked increases by run time configuring soft logic cores for accelerating matrix multiplication and providing real time output.

SUMMARY OF THE INVENTION

According to a first aspect of the invention, there is provided a method for transposition of a detected object and its tracking from a 3D sensor to a different system in 6 degrees of freedom. The method comprises, (without restricting to any particular order) receiving sensing data from the one or more 3D sensors; generating 3D cartesian coordinates of reflections and intensities with respect to the respective 3D sensors; searching, detecting, classifying, segmenting and forecasting motion of objects in the 3D surrounding keeping the respective 3D sensor as origin; transposing the origin for the coordinates of the searched, detected, classified and tracked object in real time to one or more secondary devices; and providing the real time detection, classification and tracking of the object to a user context application with the one or more secondary devices as origin, without any delay real time covering all 6 Degrees of Freedom.

In accordance with an embodiment of the present invention, the objects are selected from one or more of living and non-living objects including, but not limited to, humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

In accordance with an embodiment of the present invention, the one or more 3D sensors are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

In accordance with an embodiment of the present invention, the one or more secondary devices are selected from one or more cameras, secondary sensors such as secondary LIDAR, RADAR, ultrasonic sensors, infrared sensors, lasers or a combination thereof.

In accordance with an embodiment of the present invention, the step of transposing the origin for the coordinates of the searched, detected, classified and tracked object from respective 3D sensors, further comprises definition and processing of a rotation matrix, a displacement matrix and a coordinate transpose matrix to determine new coordinates of the searched, detected, classified and tracked object having the one or more secondary devices as origin. Further, the coordinate transpose matrix is only a (4×4) matrix, even for 6 degrees of freedom, thereby keeping the processing power consumption and time complexity to a bare minimum.

According to a second aspect of the invention, there is provided a system for transposition of a detected object and its tracking from a 3D sensor to a different system in 6 degrees of freedom. The system comprises, but not limited to, one or more 3D sensors; one or more secondary devices; and a processing module connected with each of the one or more 3D sensors, one or more secondary devices and the data repository. Further, the processing module comprises a memory unit configured to store machine-readable instructions; and a processor operably connected with the memory unit, the processor obtaining the machine-readable instructions from the memory unit, and being configured by the machine-readable instructions to receive sensing data from the one or more 3D sensors; generate 3D cartesian coordinates of reflections and intensities with respect to the respective 3D sensors; search, detect, classify, segment and forecast motion of objects in the 3D surrounding keeping the respective 3D sensor as origin; transpose the origin for the coordinates of the searched, detected, classified and tracked object in real time to the one or more secondary devices; and provide the real time detection, classification and tracking of the object to a user application with the one or more secondary devices as origin, without any delay real time covering all 6 Degrees of Freedom.

In accordance with an embodiment of the present invention, the processing module further comprises a configurable processing unit operably connected with the memory unit and the processor, configured to accelerate matrix multiplications by run time creation of soft logic cores to enable hardware threading when processing load increases and hence provide real time results; and an operating system configured to make the processing on the Software (SW) threads on processor and Hardware (HW) threads on configurable processing unit transparent to application.

In accordance with an embodiment of the present invention, the objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

In accordance with an embodiment of the present invention, the one or more 3D sensors are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

In accordance with an embodiment of the present invention, the one or more secondary devices are selected from one or more cameras, secondary sensors such as secondary LIDAR, RADAR, ultrasonic sensors, infrared sensors, lasers or a combination thereof.

In accordance with an embodiment of the present invention, for transposing the origin for the coordinates of the searched, detected & classified object from respective 3D sensors, the processor is further configured to define and process a rotation matrix, a displacement matrix and a coordinate transpose matrix to determine new coordinates of the searched, detected & classified object having the one or more secondary devices as origin. Further the coordinate transpose matrix is only a (4×4) matrix, even for 6 degrees of freedom, thereby keeping the processing power consumption and time complexity to a bare minimum.

BRIEF DESCRIPTION OF THE DRAWINGS

So that the manner in which the above recited features of the present invention can be understood in detail, a more particular to the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments.

These and other features, benefits and advantages of the present invention will become apparent by reference to the following text figure, with like reference numbers referring to like structures across the views, wherein.

DETAILED DESCRIPTION OF THE DRAWINGS

Figure 1A:
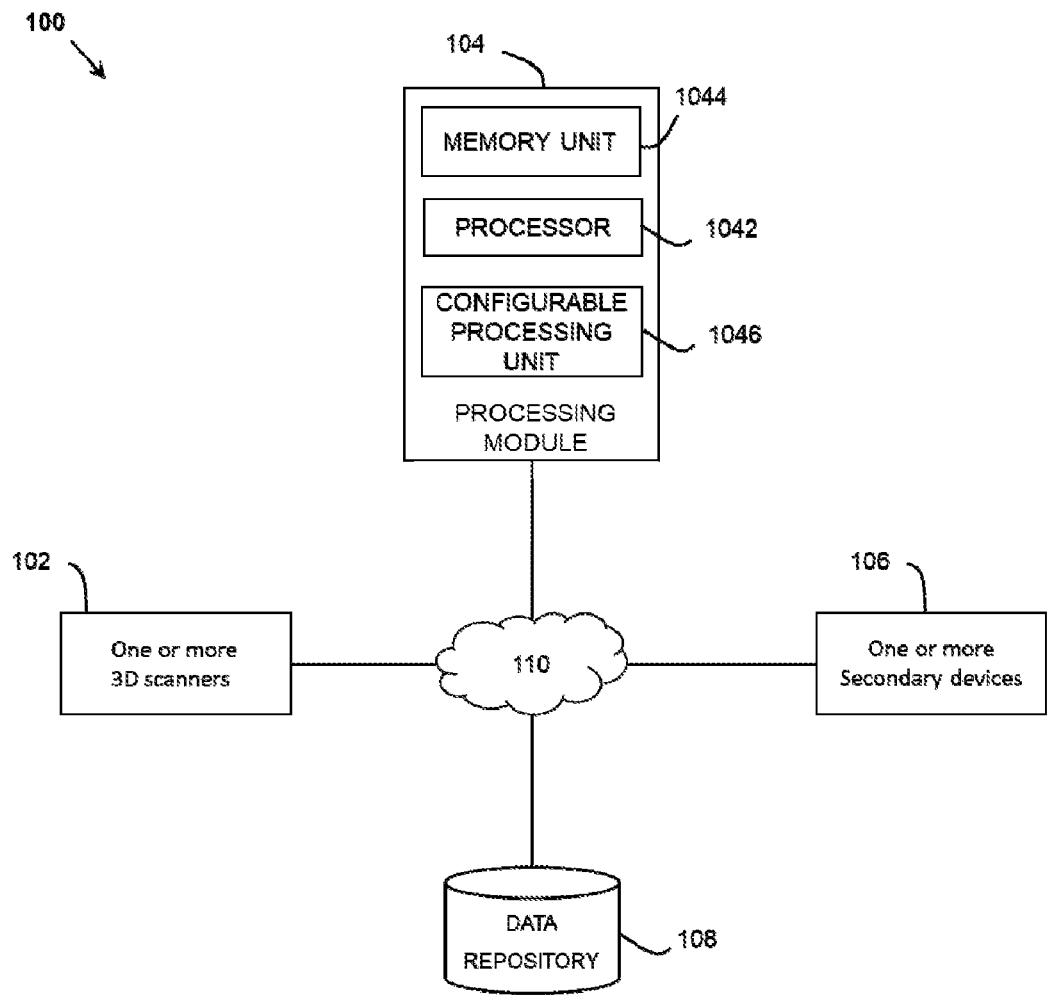
FIG. 1A illustrates a system for transposition of a detected object and its tracking from a 3D sensor to a different system in 6 degrees of freedom, in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

FIG. 1A illustrates a system (100) for transposition of a detected object and its tracking from a 3D sensor to a different system (100) in 6 degrees of freedom, in accordance with an embodiment of the present invention. The present invention is envisaged to detect raw 3D cartesian coordinates of reflections and intensities and then searches, detects, classifies, segments and forecasts motion of objects in the 3D space/surrounding. The system (100) is envisaged to provide three major capabilities—perceive, predict & plan.

The system (100) comprises, but not limited to, one or more 3D sensors (102), one or more secondary devices (106), a processing module (104) and a data repository (108). The one or more 3D sensors (102) may be selected from, but not limited to, a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors etc. Further, the one or more secondary devices (106) may be one or more cameras, secondary sensors such as secondary LIDAR, RADAR, ultrasonic sensors, infrared sensors & lasers. Herein, the one or more cameras may be, but not limited to, dome camera, bullet camera, Pan-Tilt-Zoom (PTZ) camera, C-mount Camera, Day/Night Camera, varifocal camera, HD camera, and the like.

In accordance with an embodiment of the present invention, the one or more 3D sensors (102) may be disposed at multiple locations in a surrounding (i.e. a 3D space) and similarly one or more secondary devices (106) may be placed covering the 3D space. For example: the one or more secondary devices (106) (say cameras) may be mounted on a robot and the system (100) may be used to provide real-time information (such as a digital 3-D representation etc.) of the surroundings using the one or more 3D sensors (102) to assist in motion.

According to an example embodiment, Imagine that there is a very important infrastructure like that of a Nuclear Power Plant and Research facility which is vulnerable to infiltration and attacks from unsocial entities. In such an establishment, security and surveillance is of primary importance. 3D Sensors might be used at the perimeter of such a facility to search detect classify track and segment if any human is approaching the perimeter of the facility. In such a case it is also required that once a human comes near to the perimeter of the facility beyond a certain distance, a visual verification of the person is also required to be done by a PTZ camera while tracking the movement of the person coming near to the perimeter. The PTZ camera has a long range of view because of its pan tilt and zoom functionality and hence would be at a different location that the 3D sensor and might cover the area covered by multiple 3D sensor modalities installed at the perimeter. In such a case, the moment a person is detected by the 3D sensor to be near to the perimeter beyond a particular distance, the system would transpose the coordinates of the detection classification and track of the person continuously to that of the PTZ camera and the camera would then steer continuously to the coordinates of the person with the PTZ camera as origin. Further to that the camera might do a facial recognition on the person approaching the perimeter and if the person is an unknown entity, continue to track his/her movement with the transposed coordinates provided by the system and raise an alarm. The same application can be extended to ports, airports and other such crowded facility for crowd management to stop people from wandering into restricted areas.

According to another example embodiment, 3D sensors can be widely used in industrial automation in order to monitor assembly and manufacturing processes. For example, there might be a particular manufacturing facility for assembly for heavy machinery parts. In this kind of a situation, 3D sensors with pre trained classification deep learning modules will be used to continuously detect classify and track the movement of the different machine parts to the different assemblies. With a pre-defined sequence of assembly, a solution application or context application can monitor if the assembly of the parts for a particular line of assembly is being done in the right sequence. The moment a wrong part enters an assembly line or an out of sequence order part enters an assembly line, the coordinates of the part can be transposed to a PTZ camera installed in the facility. The PTZ camera can then steer to the wrong part's location with the PTZ camera as origin and track the movement of the wrong part with coordinates received from the system transposed to it as origin and raise an alarm to the Facility head. This massively reduces down time and increases yield in such an assembly. Such a functionality can also be extended in ports and airports for docking of systems and containers.

The positioning of the one or more sensors and the one or more secondary devices (106) may vary depending on the type of application. In some embodiments, one or more secondary devices (106) such as secondary LIDAR sensor or RADAR may be used with one or more 3D sensors (102) and placed in different locations which may or not have any overlapping field of view, depending upon the application.

Additionally, the data repository (108) may be a local storage (such as SSD, eMMC, Flash, SD card, etc) or a cloud-based storage. In any manner, the data repository (108) is envisaged to be capable of providing the data to the processing module (104), when the data is queried appropriately using applicable security and other data transfer protocols. The data repository (108) is configured to store the data and deep learning trained models of the multiple objects of all kinds of living and non-living objects selected from a group comprising, but not limited to, humans of multiple age groups (along with their physical characteristics & features), animals, plants, furniture, vehicles, natural resources, eatables, crops, infrastructure, stationery, sign boards, wearables, musical instruments, sports equipment, mechanical tools, electrical equipment, electronic equipment, and the like. In accordance with an embodiment of the present invention, the data repository (108) may be used for comparison with the detected objects for their identification and classification and/or in case, an object detected is an unseen object, then such objects may be stored for future reference. The data repository (108) is also configured to store the data bit streams for run time configuration of soft cores, for accelerating matrix multiplication and providing real time output in case the number of objects detected and tracked increases. Further, the processing module (104) is connected with each of the one or more 3D sensors (102), one or more secondary devices (106) and the data repository (108). The processing module (104) is envisaged to include computing capabilities such as a memory unit (1042) configured to store machine readable instructions. The machine-readable instructions may be loaded into the memory unit (1042) from a non-transitory machine-readable medium, such as, but not limited to, CD-ROMs, DVD-ROMs and Flash Drives. Alternately, the machine-readable instructions may be loaded in a form of a computer software program into the memory unit (1042). The memory unit (1042) in that manner may be selected from a group comprising EPROM, EEPROM and Flash memory.

Figure 1B:
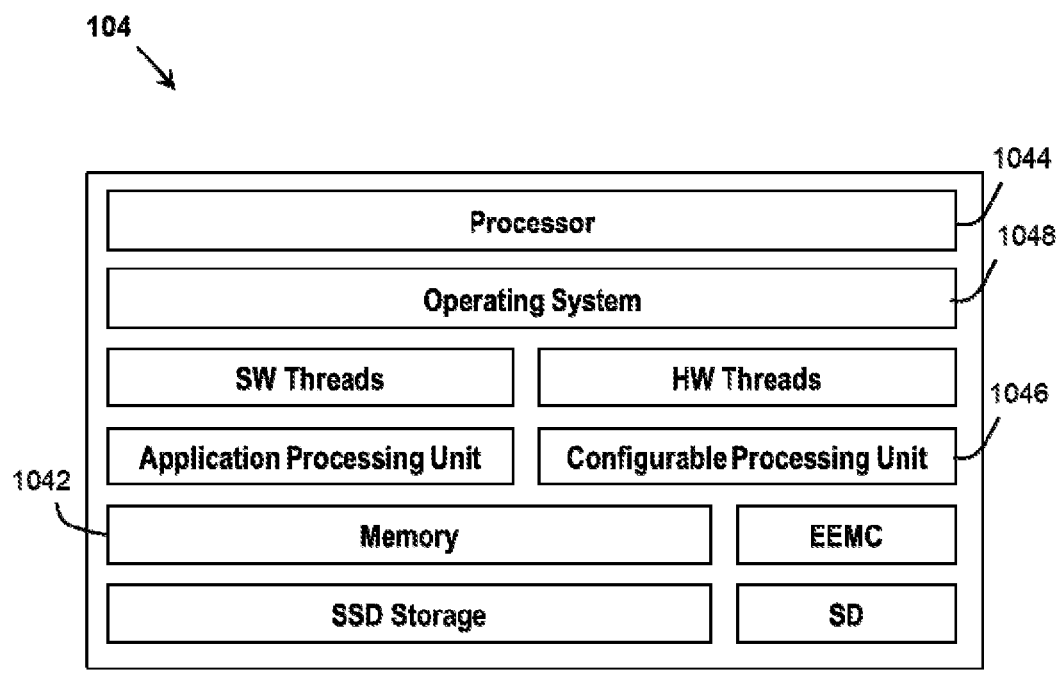
FIG. 1B illustrates a block diagram of a processing module of the system of FIG. 1A, in accordance with an embodiment of the present invention.

The processing module (104) has been shown in a detailed block diagram in FIG. 1B, in accordance with an embodiment of the present invention. As shown in FIG. 1B, the processing module (104) includes a processor (1044) operably connected with the memory unit (1042). In various embodiments, the processor (1044) may be a microprocessor selected from one of, but not limited to a ARM based or Intel based processor (1044) or in the form of field-programmable gate array (FPGA), a general-purpose processor (GPP) and an application specific integrated circuit (ASIC). Additionally, the processing module (104) may further include a configurable processing unit (1046), an operating system (1048), an Application Processing Unit (APU), Hardware (HW) threads, Software (SW) threads, SSD storage, EMCC, SD etc. The configurable processing unit (1046) is operably connected with the memory unit (1042) and the processor (1044) and is configured to accelerate matrix multiplications by run time creation of soft logic cores to enable hardware threading when processing load increases and hence provide real time results. Furthermore, the operating system (1048) is configured to make the processing on the SW threads on processor (1044) and HW threads on configurable processing unit (1046) transparent to user context application.

Moreover, the processing module (104) may implement artificial intelligence and deep learning-based technologies for, but not limited to, data analysis, collating data & presentation of data in real-time.

In accordance with an embodiment of the present invention, a communication network (110) may also be used in the system (100). The communication network (110) can be a short-range communication network and/or a long-range communication network, wire or wireless communication network (110). The communication interface includes, but not limited to, a serial communication interface, a parallel communication interface or a combination thereof. The communication network (110) may be implemented using a number of protocols, such as but not limited to, TCP/IP, 3GPP, 3GPP2, LTE, IEEE 802.x etc. The communication network (110) may be wireless communication network selected from one of, but not limited to, Bluetooth, radio frequency, internet or satellite communication network (110) providing maximum coverage.

Figure 2:
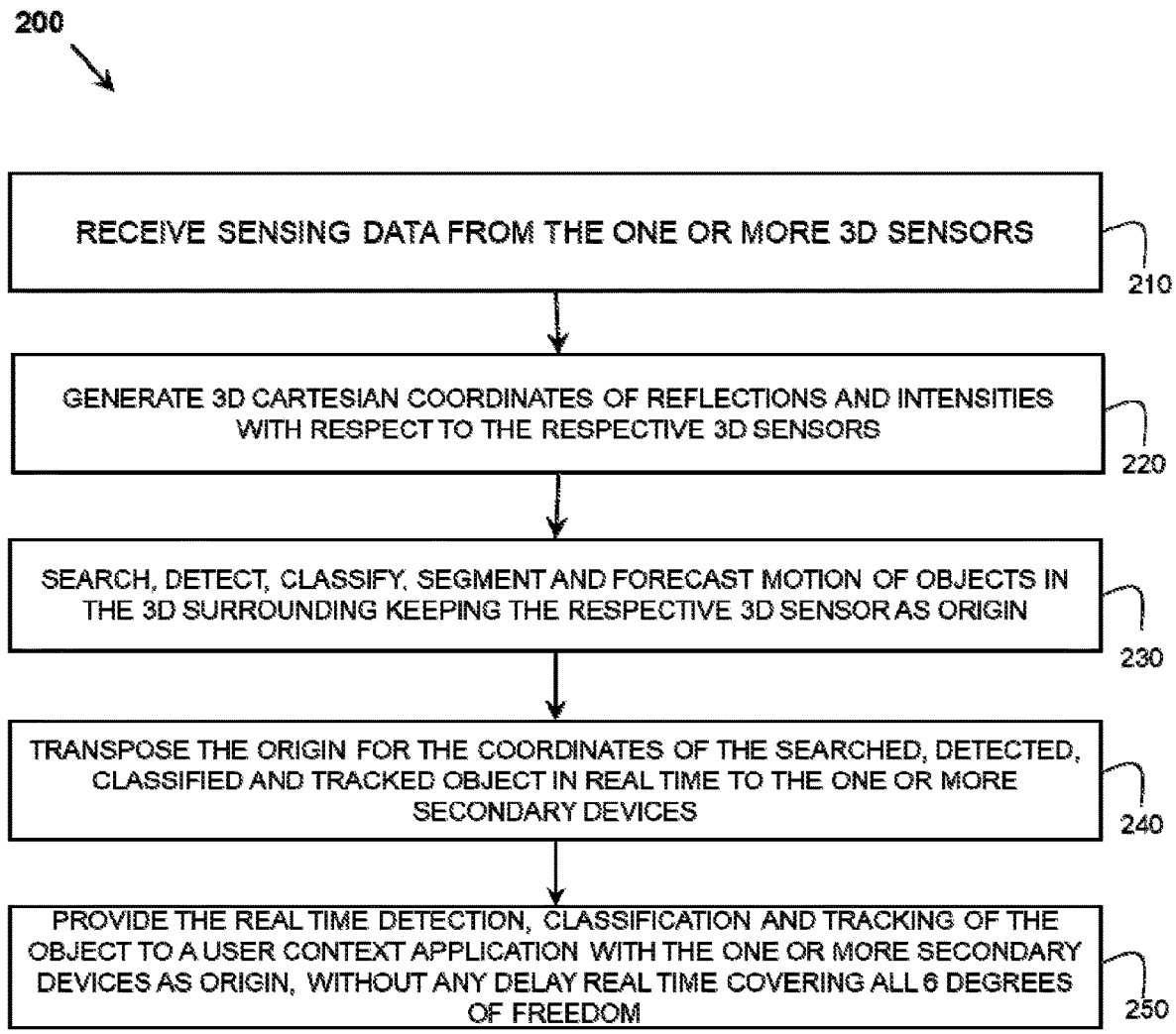
FIG. 2 illustrates a method for transposition of a detected object and its tracking from a 3D sensor to a different system in 6 degrees of freedom, in accordance with an embodiment of the present invention.
Figure 3:
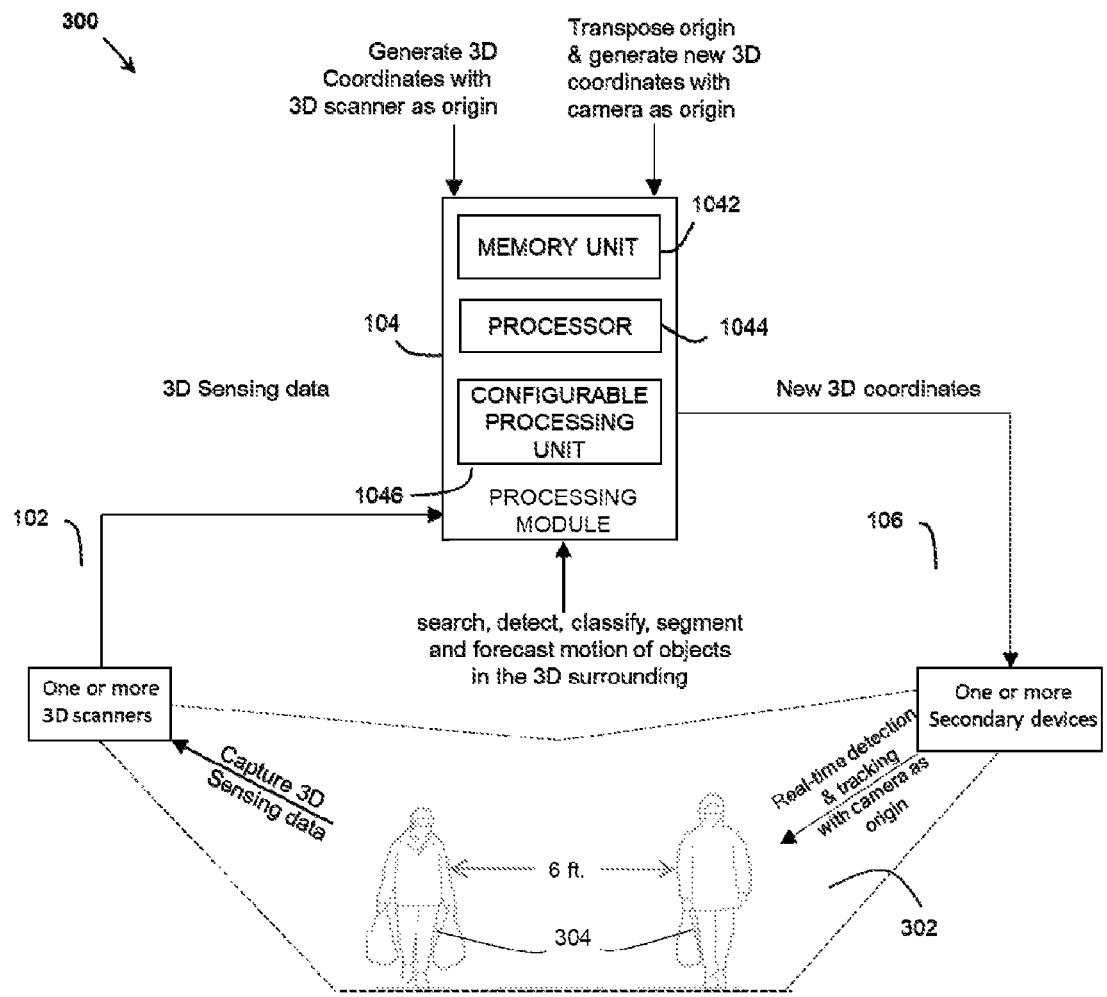
FIG. 3 illustrate information flow diagrams for implementation of system and method shown FIG. 1A and FIG. 2, in accordance with an embodiment of the present invention.

FIG. 2 illustrates a method (200) for transposition of a detected object and its tracking from a 3D sensor to a different system (100) in 6 degrees of freedom, in accordance with an embodiment of the present invention. The method (200) and the system (100) would be more clearly understood using the following exemplary implementation. FIG. 3 illustrates information flow diagram (300) for implementation of system (100) and method shown FIG. 1A and FIG. 2, in accordance with an embodiment of the present invention. In this example shown in FIG. 3, an area (302) of a shopping mall is to be monitored to ensure whether people are maintaining social distancing. Now, only a LiDAR or only a camera are incapable or insufficient for such applications, because LiDARs don't provide visuals like cameras (for applications like facial recognition of violators of social distancing) and PTZ cameras cannot provide depth information (for detection and tracking of social distancing violators). So, both are required to be used in combination but both the LiDAR and the PTZ camera have their own field of view. The present invention provides a solution for this problem with the method shown in FIG. 2.

Referring to FIG. 2, the method starts at step 210, by receiving sensing data from the one or more 3D sensors (102). Herein, it is assumed that the system (100) has one 3D sensor (such as a LIDAR) and one secondary device (such as PTZ camera) that are present in a surrounding/3D space (within the shopping mall) (302) but at different positions (x,y,z) and at different roll, pitch and yaw to each other. In this implementation, they have overlapping field of view as can be seen from FIG. 3 but that is not a necessity. So, the LiDAR captures that sensing data and sends the same to the processing module (104). The sensing data may be in the form of, but not limited to, 3D point cloud or data points.

Then, at step 220, the processor (1044) generates 3D cartesian coordinates of reflections and intensities with respect to the respective 3D sensors. These coordinates are generated with respect to the LiDAR (i.e. the one or more 3D sensors (102) (102)) as origin. Further, at step 230, the processor (1044) searches, detects, classifies, segments and forecasts motion of objects (304) in the 3D surrounding keeping the respective 3D sensor as origin. This may be done by searching and comparing the detected objects (304) through deep learning with data of all kinds of living and non-living objects stored in the data repository (108). These include humans of multiple age groups, animals, plants, furniture, vehicles, natural resources, eatables, crops, infrastructure, stationery, sign boards, wearables, musical instruments, sports equipment, mechanical tools, electrical equipment and electronic equipment. This enables the processor (1044) to identify & classify the detected object (304), while the LiDAR may continue to track the detected object(s). Like in this example, the objects (304) are detected to be two humans walking with the shopping bags in the shopping mall. The processor (1044) may also forecast/predict the motion of the object (304) based on received tracking information.

In this particular example, the user context application requires to steer and track the object (searched, detected & classified) by processing module (104) on the 3D sensor point cloud but with PTZ camera as origin. By default, the coordinates of the searched, detected and classified object with its tracking are provided with the 3D sensor as origin.

In such a requirement, the output of processing module (104) is to be converted to a different origin in real time without any lag. Therefore, at step 240, the processing module (104) transposes the origin for the coordinates of the searched, detected, classified and tracked object (304) in real time to the one or more secondary devices (106). The transpose or conversion has to take into account 6 degrees of freedom as in a 3D space, it would include difference in orientation in X, Y, Z as well as Roll, Pitch and Yaw.

With respect to the pitch, roll and yaw of the 3D sensor (i.e. LiDAR in this example), the processor (1044) continuously produces the coordinates of the searched detected and classified object (304) as it tracks the object (304) in real time in the form of cartesian coordinates (x, y, z). It is to be noted that the before the processor (1044) starts the operations, a coordinate transpose matrix T is pre-calculated based on the individual positions/coordinates of the one or more 3D sensors (102) and the one or more secondary devices (106). During the operation, the processor (1044) calculates new coordinates with the new origin (i.e. the one or more secondary sensors) using the coordinate transpose matrix.

[x, y, z NEW on System (100) 2]=T*[x, y, z OLD on System (100) 1]

Following are the computations involved in the above-mentioned process:

Rotation Matrix

These are the angles that the 3D sensor (102) should be rotated in order to achieve the same angles or configuration of the PTZ Camera (106):

Assuming rotation about X axis=$\alpha$
Assuming rotation about Y axis=$\beta$
Assuming rotation about Z axis=$\gamma$ The order of rotation plays an important role during the calculation so that is predetermined.

With the information of the above rotation to be made to 3D Sensor (102) in order to achieve the same angles or configuration as PTZ Camera (106), the rotation matrix is defined for rotation about x, y and z axis respectively as:

$$Rx = \begin{bmatrix} 1 & 0 & 0 \\ 0 & \cos\alpha & -\sin\alpha \\ 0 & \sin\alpha & \cos\alpha \end{bmatrix}$$

$$Ry = \begin{bmatrix} \cos\beta & 0 & \sin\beta \\ 0 & 1 & 0 \\ -\sin\beta & 0 & \cos\beta \end{bmatrix}$$

$$Rz = \begin{bmatrix} \cos\gamma & -\sin\gamma & 0 \\ \sin\gamma & \cos\gamma & 0 \\ 0 & 0 & 1 \end{bmatrix}$$

Then, Rotation Matrix of System (100) 1 (3D Sensor) to System (100) 2

$$(PTZ\ Camera) = 1\,R\,2 \quad \text{(formula i)}$$

$$= Rx * Ry * Rx$$

Final Rotation Matrix = $R$ = Transpose of (1 $R$ 2)

Displacement Matrix

Similarly, a Displacement Matrix is defined, $$D1 = \begin{bmatrix} dx \\ dy \\ dz \end{bmatrix}$$

Where, dx=Displacement of origin of system (100) 2 (PTZ Camera) wrt system (100) 1 (3D sensor) in X direction (x2−x1)

dy=Displacement of origin of system (100) 2 (PTZ Camera) wrt system (100) 1 (3D sensor) in Y direction (y2−y1)

dz=Displacement of origin of system (100) 2 (PTZ Camera) wrt system (100) 1 (3D sensor) in Z direction (z2−z1)

Final Displacement Matrix = $D$ $$= (-) * [R] * [D1]$$

$$= (-) * [\text{Transpose}(1\,R\,2)] * [D1] \ldots \text{(from formula } i)$$

Coordinate Transpose Matrix

The final Coordinate Transpose Matrix is given by=

$$T(4\times 4) = \begin{bmatrix} R(3*3) & D(3*1) \\ 0(1*3) & 1 \end{bmatrix}$$

With T (4×4 matrix) calculated beforehand, while processor (1044) searches detects classifies and tracks objects on the point cloud with the 3D sensor (102) as origin, the new Cartesian Coordinates can be reported to the user application by processor (1044) with PTZ Camera (106) as the new origin as shown below:

$$\begin{bmatrix} Xnew \\ Ynew \\ Znew \\ 1 \end{bmatrix}$$

The new changed coordinates with the PTZ Camera (106) as origin=

$$\begin{bmatrix} R(3*3) & D(3*1) \\ 0(1*3) & 1 \end{bmatrix} \begin{bmatrix} Xold \\ Yold \\ Zold \\ 1 \end{bmatrix}$$

or,

[x, y, z NEW on System (100) 2]=T*[x, y, z OLD on System (100) 1]

In this manner, based on the location and orientation of the 3D sensor (102) and the PTZ camera (106) where the coordinates are to be transposed in real time, the Coordinate Transpose Matrix T is defined which is a 4×4 matrix and not a 6×6 matrix. It is advantageous as the matrix multiplications are computationally inexpensive and are easier to implement for real time applications in HW or SW threads, i.e. both on a configurable processing unit (1046) as a soft core for accelerating matrix multiplication as well as on the APU. There would be no delay or lag when we have to just multiply the 3D coordinates with a T(4×4) matrix to get the new 3D Coordinates.

So, finally at step 250, the processor (1044) provides the real time detection, classification and tracking of the object with the one or more secondary devices (106) as origin, without any delay real time covering all 6 Degrees of Freedom. So, returning to the implementation shown in FIG. 3, the humans moving in the shopping mall may directly be monitored from the feed of PTZ camera by steering the PTZ camera (106) to the location of the two shopping persons as now the coordinates of the objects (the two shopping persons) (304) is received with the PTZ camera (106) as origin, where information from the LiDAR (102) is also presented. For example: distance between the humans may be shown on the screen displaying live feed from the PTZ camera, or there may be different alerts indicative of a predetermined distance not being maintained or any other implementation depending on the user's application of the present invention.

Additionally, the present invention does not essentially require the field of view of the one or more 3D sensors (102) and the one or more secondary to be overlapping. This because the system (100) only needs to receive the coordinates of the detected object from 3D sensors as origin and then generate new coordinates with the one or more secondary devices (106) (as origin) or vice versa. Accordingly, the object detection and tracking may be provided with secondary devices as origin. So, Field of View does not play an essential part in the present invention and is only a subject of implementation by the user context application. Apart from the above mentioned example, the user context application may be selected from applications such as, but not limited to, security & surveillance, industrial automation, warehouse automation, airport automation, smart spaces, railways, traffic intersection automation, robotics etc.

The present invention offers a number of advantages. Firstly, it provides a cost-effective and technologically advanced solution to the problems of the prior art, the solution provided herein is easy to understand and implement. Then, the present invention provides a solution to accurately transpose the 3D coordinates of the searched, detected and classified objects along with their tracks from the 3D sensor as an origin and move the same to a secondary device as reference and origin as per the requirement of the end user application. Although the degree of freedom is 6, the coordinate Transpose Matrix is only a (4×4) matrix thereby keeping the time and processing complexity to bare minimum. Additionally, the present invention is computationally feasible and relatively inexpensive. Moreover, it produces real time results with no lag which is a major requirement in many applications. Further, it can easily be implemented in software as well as hardware threads.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention.

We claim:

1. A method (200) for transposition of a detected object and its tracking from a 3D sensor to a different system (100) in 6 degrees of freedom, the method comprising:
   receiving (210) sensing data from the one or more 3D sensors (102);
   generating (220) 3D cartesian coordinates of reflections and intensities with respect to the respective 3D sensors;
   searching, detecting, classifying, segmenting and forecasting motion (230) of objects in the 3D surrounding keeping the respective 3D sensor as origin;
   transposing (240) the origin for the coordinates of the searched, detected, classified and tracked object in real time to one or more secondary devices (106) using a 4×4 matrix to determine new coordinates of the object covering all 6 degrees of freedom; and
   providing (250) the real time detection, classification and tracking of the object to a user context application with the one or more secondary devices (106) as origin, without any delay in real time covering all 6 Degrees of Freedom.

2. The method (200) as claimed in claim 1, wherein the objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

3. The method (200) as claimed in claim 1, wherein the one or more 3D sensors (102) are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

4. The method (200) as claimed in claim 1, wherein the one or more secondary devices (106) are selected from one or more cameras, secondary sensors such as secondary LIDAR, RADAR, ultrasonic sensors, infrared sensors, lasers or a combination thereof.

5. The method (200) as claimed in claim 1, wherein the step of transposing (240) the origin for the coordinates of the searched, detected & classified object from respective 3D sensors, further comprises definition and processing of a rotation matrix, a displacement matrix and a coordinate transpose matrix to determine new coordinates of the searched, detected & classified object having the one or more secondary devices (106) as origin;

wherein the coordinate transpose matrix is only a (4×4) matrix, even for 6 degrees of freedom, thereby keeping the processing power consumption and time complexity to a bare minimum.

6. A system (100) for transposition of a detected object and its tracking from a 3D sensor to a different system (100) in 6 degrees of freedom, the system (100) comprising:
   one or more 3D sensors (102);
   one or more secondary devices (106); and
   a processing module (104) connected with each of the one or more 3D sensors (102), one or more secondary devices (106) and a data repository (108), the processing module (104) comprising:
   a memory unit (1042) configured to store machine-readable instructions; and
   a processor (1044) operably connected with the memory unit (1042), the processor (1044) obtaining the machine-readable instructions from the memory unit (1042), and being configured by the machine-readable instructions to:
   receive sensing data from the one or more 3D sensors (102);
   generate 3D cartesian coordinates of reflections and intensities with respect to the respective 3D sensors;
   search, detect, classify, segment and forecast motion of objects in the 3D surrounding keeping the respective 3D sensor as origin;
   transpose the origin for the coordinates of the searched, detected, classified and tracked object in real time to the one or more secondary devices (106) using a 4×4 matrix to determine new coordinates of the object covering all 6 degrees of freedom; and
   provide the real time detection, classification and tracking of the object to a user application with the one or more secondary devices (106) as origin, without any delay in real time covering all 6 Degrees of Freedom.

7. The system (100) as claimed in claim 6, wherein the processing module (104) further comprising:
   a configurable processing unit (1046) operably connected with the memory unit (1042) and the processor (1044), configured to accelerate matrix multiplications by run time creation of soft logic cores to enable hardware threading when processing load increases and hence provide real time results; and
   an operating system (1048) (100) configured to make the processing on the Software (SW) threads on processor (1044) and Hardware (HW) threads on configurable processing unit (1046) transparent to application.

8. The system (100) as claimed in claim 6, wherein the objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

9. The system (100) as claimed in claim 6, wherein the one or more 3D sensors (102) are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

10. The system (100) as claimed in claim 6, wherein the one or more secondary devices (106) are selected from one or more cameras, secondary sensors such as secondary LIDAR, RADAR, ultrasonic sensors, infrared sensors, lasers or a combination thereof.

11. The system (100) as claimed in claim 6, wherein for transposing the origin for the coordinates of the searched, detected & classified object from respective 3D sensors, the processor (1044) is further configured to define and process a rotation matrix, a displacement matrix and a coordinate transpose matrix to determine new coordinates of the searched, detected & classified object having the one or more secondary devices (106) as origin;

wherein the coordinate transpose matrix is only a (4×4) matrix, even for 6 degrees of freedom, thereby keeping the processing power consumption and time complexity to a bare minimum.

\* \* \* \* \*